(12) United States Patent  (10) Patent No.: US 8,924,182 B2
Berkcan et al.  (45) Date of Patent: Dec. 30, 2014

(54) HARSH ENVIRONMENT SENSOR SYSTEM AND DETECTION METHODS

(75) Inventors: Ertugrul Berkcan, Clifton Park, NY (US); Canan Uslu Hardwicke, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 382 days.

(21) Appl. No.: 12/510,302

(22) Filed: Jul. 28, 2009

(65) Prior Publication Data

US 2011/0029282 A1 Feb. 3, 2011

(51) Int. Cl.
*H04Q 9/00* (2006.01)
*G01D 21/00* (2006.01)

(52) U.S. Cl.
CPC ............. *H04Q 9/00* (2013.01); *G01D 21/00* (2013.01); *G08C 2201/10* (2013.01); *H04Q 2209/40* (2013.01); *H04Q 2209/86* (2013.01)
USPC ........................................... 702/182

(58) Field of Classification Search
CPC .... F01D 15/10; G01D 21/00; G08C 2201/10; H04Q 2209/40
USPC ...................... 702/182; 340/539.26
See application file for complete search history.

(56) References Cited

U.S. PATENT DOCUMENTS

| | | | |
|---|---|---|---|
| 5,995,898 A * | 11/1999 | Tuttle | 701/102 |
| 6,323,641 B1 * | 11/2001 | Allwine | 324/207.2 |
| 6,522,131 B1 * | 2/2003 | Hiligsmann et al. | 324/207.2 |
| 6,576,861 B2 * | 6/2003 | Sampath et al. | 219/121.48 |
| 6,662,091 B2 * | 12/2003 | Wilson et al. | 701/29.3 |
| 6,838,157 B2 * | 1/2005 | Subramanian | 428/173 |
| 7,004,622 B2 | 2/2006 | Hardwicke et al. | |
| 7,202,753 B2 * | 4/2007 | Takada | 331/107 A |
| 7,360,437 B2 | 4/2008 | Hardwicke et al. | |
| 7,368,827 B2 | 5/2008 | Kulkarni et al. | |

(Continued)

FOREIGN PATENT DOCUMENTS

| | | |
|---|---|---|
| CN | 1581678 A | 2/2005 |
| JP | 05107140 A | 4/1993 |
| JP | 2007141131 A | 6/2007 |
| JP | 2008545132 A | 12/2008 |

OTHER PUBLICATIONS

Vittoz, et al., "High-Performance Crystal Oscillator Circuits: Theory and Application", IEEE Journal of Solid-State Circuits, Vol. 23, No. 3, June 1988, pp. 774-783.*

(Continued)

*Primary Examiner* — Jonathan C Teixeira Moffat
*Assistant Examiner* — Regis Betsch
(74) *Attorney, Agent, or Firm* — Ann M. Agosti (57) ABSTRACT

A system for measuring a plurality of operating parameters of an object in a harsh environment is provided. The system includes a first energy transceiver system configured to transceive energy signals. The system also includes a transcieved modulant coupled to the first energy transceiver system. The system further includes a second energy transceiver system at least partially disposed on the object and capable of being interrogated by the first energy transceiver system. The second energy transceiver system still further includes a sensing system. The system also includes a processor coupled to the first energy transceiver system. The processor is configured to determine of the plurality of the operating parameters of the object in the harsh environment based upon the transceived modulant.

8 Claims, 4 Drawing Sheets

(56) References Cited

U.S. PATENT DOCUMENTS

| | | | | |
|---|---|---|---|---|
| 2005/0040945 | A1* | 2/2005 | Parks et al. | 340/539.27 |
| 2008/0054645 | A1* | 3/2008 | Kulkarni et al. | 290/52 |
| 2008/0204275 | A1* | 8/2008 | Wavering et al. | 340/870.16 |
| 2008/0246467 | A1 | 10/2008 | Vial et al. | |
| 2008/0258875 | A1* | 10/2008 | Jesme et al. | 340/10.1 |
| 2010/0156629 | A1* | 6/2010 | Sexton et al. | 340/540 |

OTHER PUBLICATIONS

Teh, K.S., "Selective plating of nickel ceramic composite films for MEMS applications", 2002, The Fifteenth IEEE International Conference on , vol., No., pp. 384-387 URL: http://ieeexplore.ieee.org/stamp/stamp.jsp?tp=&arnumber=984283&isnumber=21214.*

Russell G. DeAnna; "Wireless Telemetry for Gas-Turbine Applications" Mar. 2000; Available on the internet<http://gltrs.grc.nasa.gov/reports/2000/TM-2000-209815.pdf>;NASA/TM—2000-209815;ARL-MR-474; 25 Pages.

J. Li et al.; "Interdigital capacitive strain gauges fabricated by direct-write thermal spray and ultrafast laser micromachining"; Sensors and Actuators A 133 (2007)1-8.

John D. Wrbanek, Gustave C. Fralick, José M. Gonzalez &Kimala L. Laster; "Thin Film Ceramic Strain Sensor Development for High Temperature Environments"; NASA/TM-2008-215256; TP975; Available on the internet:<http://www.grc.nasa.gov/WWW/sensors/PhySen/docs/TM-2008-215256.pdf>; 21 Pages.

Unofficial English translation of Chinese Office Action issued in connection with corresponding CN Application No. 201010246474.6 on Dec. 13, 2013.

Unofficial English translation of Office Action issued in connection with corresponding JP Application No. 2010-164415 on Mar. 11, 2014.

* cited by examiner

HARSH ENVIRONMENT SENSOR SYSTEM AND DETECTION METHODS

BACKGROUND

The invention relates generally to a sensor system and more particularly, to a sensor system for measuring operating parameters of an object in a harsh environment.

Moving objects in rotating machinery, for example, blades in an aircraft engine or blade in a compressor, may experience stresses during operation in a harsh environment. Even stationary objects of machines, for example, combustion liners, nozzles or shrouds may experience stresses or strain due to extreme working conditions such as in a hot gas path or sub zero temperature conditions. Such stresses or strain developed in the objects may damage the machinery. Accurate measurement of operating parameters of the objects, such as temperature and strain, is necessary to correct or prevent any damage that may occur in the machinery. One approach to measuring operating parameters in the machinery is to use wired sensors, which require wiring between a rotating component and a stationary part of the rotary machinery using slip rings. However, a wired approach may be complex, expensive, and unreliable, due in part to the high temperature of the machinery in long-term operation, as the electronic characteristics of the wiring may limit the range of temperatures over which a wired sensor may operate accurately.

Due to the above-mentioned limitations of wired sensors, operating parameter measurements of a machine may only be taken during testing of the machinery. However, monitoring operating parameters over the entire lifespan of the machinery is desirable to ensure reliable operation. Operating parameter measurements taken in the field may be correlated with control parameters to optimize field operation of the machinery. Changes observed in operating parameter measurements over time may be also used to assess the health of the objects or components of the machinery, allowing for appropriate maintenance scheduling. Accordingly, there remains a need in the art for a harsh environment sensor system that is accurate over a wide range of temperatures and conditions, and that may be used over the lifespan of the machinery. It is also desired that this harsh environment sensor system work wirelessly at high temperatures over 500 F, where conventional electronics is not very reliable.

BRIEF DESCRIPTION

In accordance with an embodiment of the invention, a system for measuring a plurality of operating parameters of an object in a harsh environment is provided. The system includes a first energy transceiver system configured to transceive energy signals. The system also includes a transcieved modulant coupled to the first energy transceiver system. The system further includes a second energy transceiver system at least partially disposed on the object and capable of being interrogated by the first energy transceiver system. The second energy transceiver system further includes a sensing system. The system also includes a processor coupled to the first energy transceiver system. The processor is configured to measure the plurality of the operating parameters of the object in the harsh environment based upon the transceived modulant.

In accordance with another exemplary embodiment of the invention, a method for measuring an operating parameter of an object in a harsh environment is provided. The method includes transceiving energy signals via a first energy transceiver system. The method also includes modulating a transceived modulant located in the first energy transceiver system via wireless coupling with a second energy transceiver system, wherein the second energy transceiver system is at least partially disposed on the object. Further, the method includes calculating one or more operating parameters of the object in the harsh environment via a processor based upon the transceived modulant.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention are directed towards a harsh environment sensor system and a method for measuring operating parameters of an object in a harsh environment. As used herein the term 'harsh environment' refers to gas turbine environment. For example, temperatures may vary from about 800° F. to 2500° F. in a 'harsh environment'.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
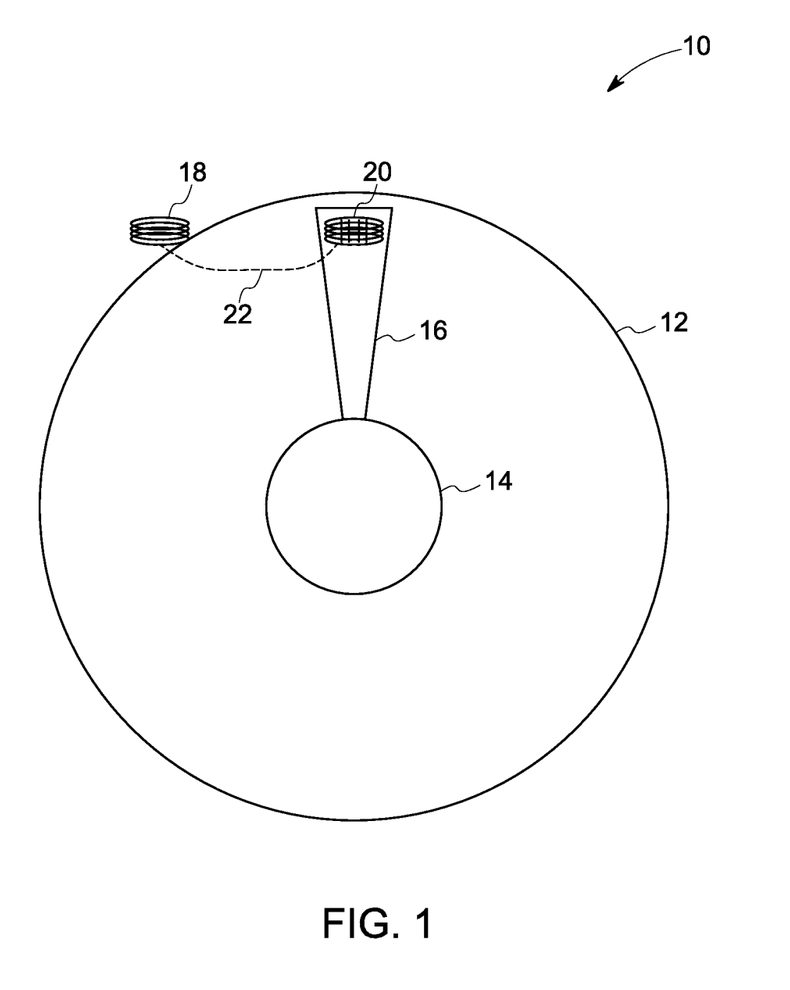
FIG. 1 is a cross-section of a rotary machine such as a turbine engine and illustrates an embodiment of a wireless harsh environment sensor system coupled to the rotary machine.

FIG. 1 shows a cross-section of a rotary machine 10 such as a turbine engine and illustrates an embodiment of a harsh environment sensor system coupled to the rotary machine 10. It should be noted that although the illustrated example is directed to a turbine engine application, the invention is more broadly applicable to wirelessly measuring operating parameters of components of any rotary machine, non-limiting examples of which include wind turbines, and electric motors. Further, the invention may also be applicable to stationary components of machines, for example, combustion liners, nozzles or shrouds which are exposed to extreme working conditions such as in a hot gas path or sub zero temperature conditions. The cross-section of the turbine engine 10 partially depicts at least two parts of the harsh environment sensor system disposed on a shroud 12 and a blade 16 respectively. Although only one blade 16 is shown, the engine 10 may comprise a plurality of blades rotating about an axle 14. The parts of the harsh environment sensor system illustrated in FIG. 1 are a first energy interface element 18 disposed on the shroud and a second energy interface element 20 disposed on the rotating blade 16 of the turbine engine 10. In one embodiment, both the energy interface elements may be antennas arranged on the engine 10 for sensing energy signals. In a non-limiting example, the energy signals may include electromagnetic waves. The energy signals represent harsh environment parameters in a rotary machine, for example the operating parameters of a moving object of the rotary machine. Non-limiting examples of the energy interface elements may include a coil, such as an inductive coil, an antenna structure, metal on an insulator, or a drawn conductor on a ceramic substrate.

Further, an interrogation channel 22 connects the first energy interface element 18 and the second energy interface element 20. The interrogation channel 22 is a wireless communication pathway for sensed signals between the interface elements. Thereby, the second interface element 20 communicates various operating conditions of the blade such as high temperature, pressure or strain via the interrogation channel 22 to the first interface element 18. Non-limiting examples of the operating parameters may include temperature, strain, pressure, clearance and displacement.

Figure 2:
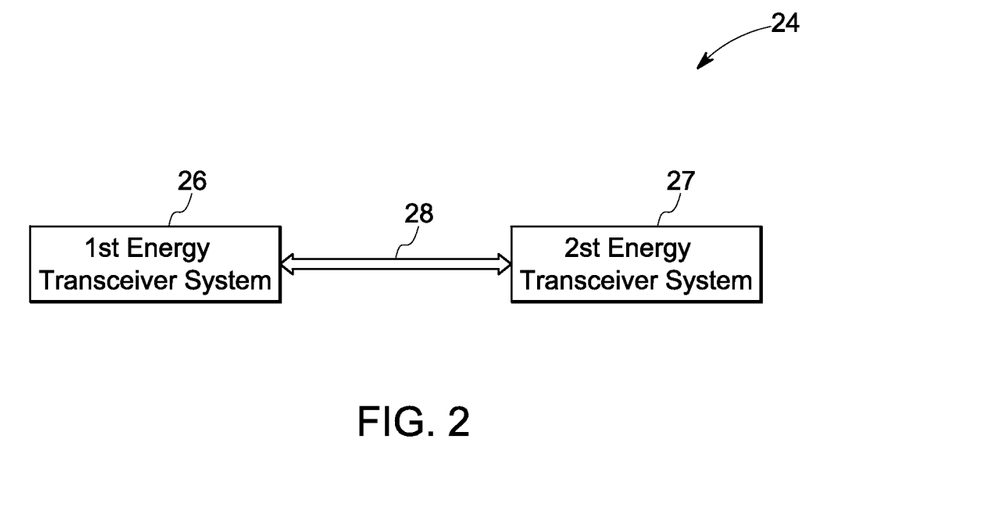
FIG. 2 is a schematic diagram representative of a harsh environment sensor system in accordance with an embodiment of the invention.

FIG. 2 shows a schematic diagram representative of a harsh environment sensor system 24 including a first energy transceiver system 26 and a second energy transceiver system 27 coupled by an interrogation channel 28. The first energy transceiver system 26 is preferably positioned adjacent to or on a stationary part of the rotary machine. On the other hand, the second energy transceiver system 27 is installed preferably on the moving object of a rotary machine. However, the second energy transceiver system 27 may be installed on a stationary component of a machine, which stationary component are usually exposed to extreme conditions such as a hot gas path or sub zero temperature conditions. The second energy transceiver system 27 continuously senses multiple operating parameters of the object and transceives the information via the interrogation channel 28. Thereby, the second energy transceiver system 27 is arranged to be continuously interrogated by the first energy transceiver system 26. In one embodiment, the interrogation channel 28 is a magnetic channel. In some embodiments, the interrogation channel 28 may be a magnetic coupling such as a near field, a mutually inductive coupling, or a far field electric field coupling.

Figure 3:
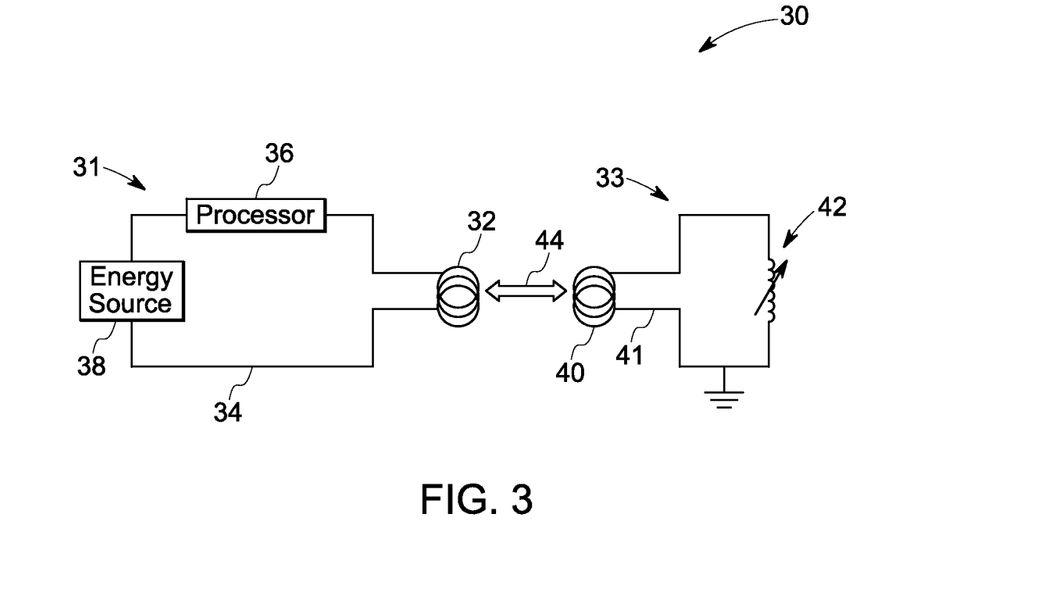
FIG. 3 shows another embodiment of a harsh environment sensor system.

FIG. 3 illustrates wirelessly coupled sensor circuits of the harsh environment sensor system 30 in accordance with one embodiment of the instant invention. As illustrated, the sensor system 30 includes a first energy transceiver system 31 comprising a first interface element 32, a processor 36 and an energy source 38 in a sensor circuit 34. The first interface element 32 such as an antenna sends and receives energy signals via an interrogation channel 44 from the second energy transceiver system 33. In one embodiment, the energy source 38 in the circuit 34 may be a voltage source such as a battery.

The second energy transceiver system 33 further comprises a second interface element 40 and sensor components 42 in another sensor circuit 41, which sensor circuit 41 may be a passive circuit disposed on the moving object such as a blade of a turbine engine. In one embodiment, the sensor components 42 may comprise a capacitor with a dielectric element disposed on the moving object for sensing the operating conditions. The moving object may experience high temperature, pressure or strain, thereby causing a change in the dielectric constant of the dielectric element. This changes the capacitance of the capacitor and further results in a change in the impedance of the circuit 41. The modulation of impedance of the circuit 41 substantially modulates the interrogation channel 44 between the first energy interface element 32 and the second energy interface element 40. The modulated interrogation channel 44 further results in a change in impedance of the sensor circuit 34 of the first transceiver system 31. This modulation of the impedance in the circuit 34 is measured and computed by the processor 36 to determine the operating conditions of the object of the machine.

It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

Figure 4:
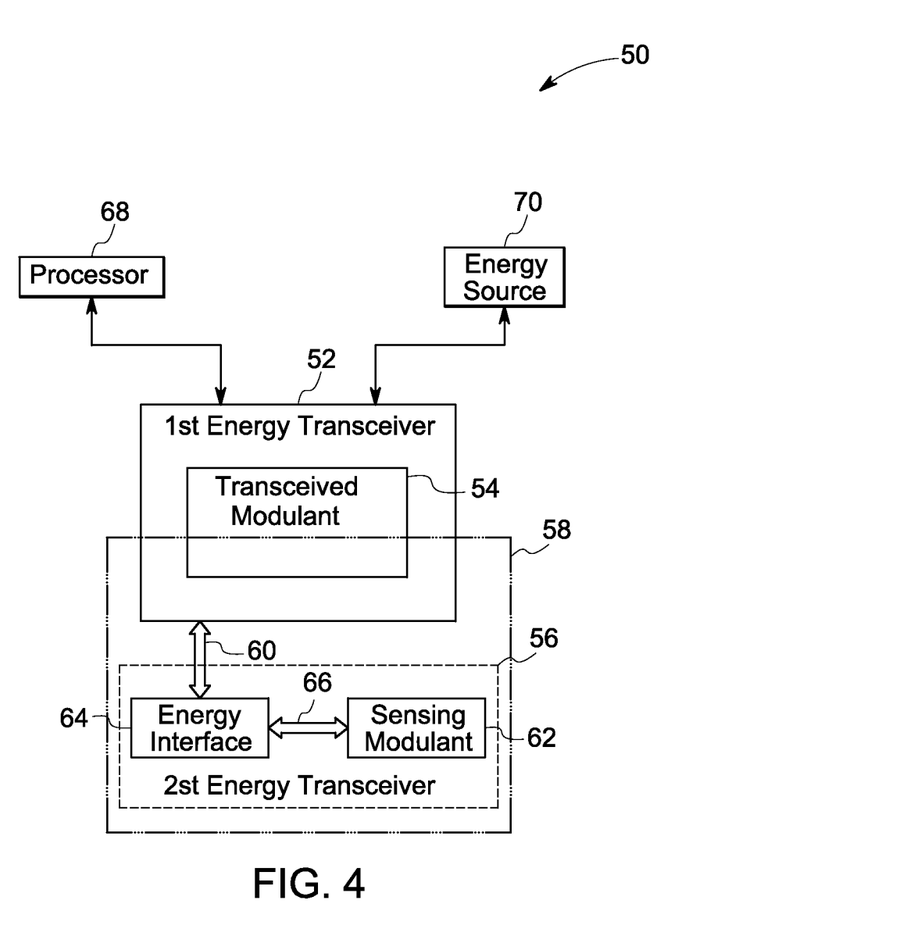
FIG. 4 is a schematic diagram representative of a harsh environment sensor system constructed in accordance with an embodiment of the invention.

FIG. 4 is a schematic diagram representative of a harsh environment sensor system 50 illustrating a functional relationship between different elements of the instant invention. The system 50 includes the first energy transceiver system 52 for transmission and reception of energy signals. The first energy transceiver system 52 may include a combination of a transmitter and a receiver having common circuitry. Any modulation in impedance of the circuitry of the first energy transceiver system 52 is represented by a transceived modulant 54. Thereby, the transceived modulant 54 is responsive to modulations in the energy signals. As illustrated, the system 50 includes a second energy transceiver system 56 located in a harsh environment 58 and disposed on the object exposed to the harsh environment 58. The second energy transceiver system 56 senses multiple operating parameters of the object located in the harsh environment 58.

In one embodiment, the second energy transceiver system 56 may include a combination of a transmitter and a receiver having common circuitry. The second energy transceiver system 56 further may include a sensor circuit and a resonance circuit. Any modulation in impedance of the resonance circuit of the second energy transceiver system 56 is represented by a sensing modulant 62. The second energy transceiver system 56 also includes an energy interface element 64. A sensing channel 66 further connects both the sensing modulant 62 and the energy interface element 64. The sensing channel 66 is a wireless communication channel for transmitting and receiving sensed information between the sensing modulant 62 and the energy interface element 64. The interface element 64 may be an antenna in the sensor circuit or the resonance circuit and provides a common interface to both the first energy transceiver 52 and the second energy transceiver 56. This enables the transmission of information from the object in a harsh environment to the first energy transceiver system 52.

An interrogation channel 60 is also illustrated in the schematic diagram of FIG. 4, which interrogation channel 60 is a wireless communication pathway between the first energy transceiver system 52 and the second energy transceiver system 56. As discussed, the transceived modulant 54 varies accordingly with the interrogation signal. In a particular embodiment, the transceived modulant 54 varies with the sensing modulant 62. The interrogation signal carries information of multiple operating parameters of the object in the harsh environment 58. For embodiments in which the interrogation channel 60 comprises a magnetic coupling, the effective coupling constant (k) of a coupling between first energy transceiver system 54 and second energy transceiver system 56 is related to the rate of change of the magnetic field (B) of the interrogation channel 60, for example, k~d/dt(B). The interrogation channel 60 is modulated by the sensing modulant 62, which sensing modulant 62 is disposed on the object. Operating parameters in a harsh environment may cause deformation in the object (for example, the blade may stretch), thereby modulating a sensing modulant 62 and causing further modulation of the interrogation channel 60. Therefore, the modulation of the interrogation channel (d(B)/dt) is a function of the displacement of sensing modulant 62. As the operating parameters of the object are substantially a function of the modulation of the sensing modulant 62, the operating parameters may be determined as a function of the coupling constant (k) between first energy transceiver system 52 and second energy transceiver system 56. This is a passive approach that uses neither active electronics, nor any p/n junctions.

Further, a processor 68 coupled to the first energy transceiver system 52 processes the interrogation signal. The processor 68 is configured to determine multiple operating parameters of the object in the harsh environment 58 based upon the transceived modulant 54. Furthermore, in one embodiment, the energy source 70 coupled to the first energy transceiver system 52 may be a voltage source.

Figure 5:
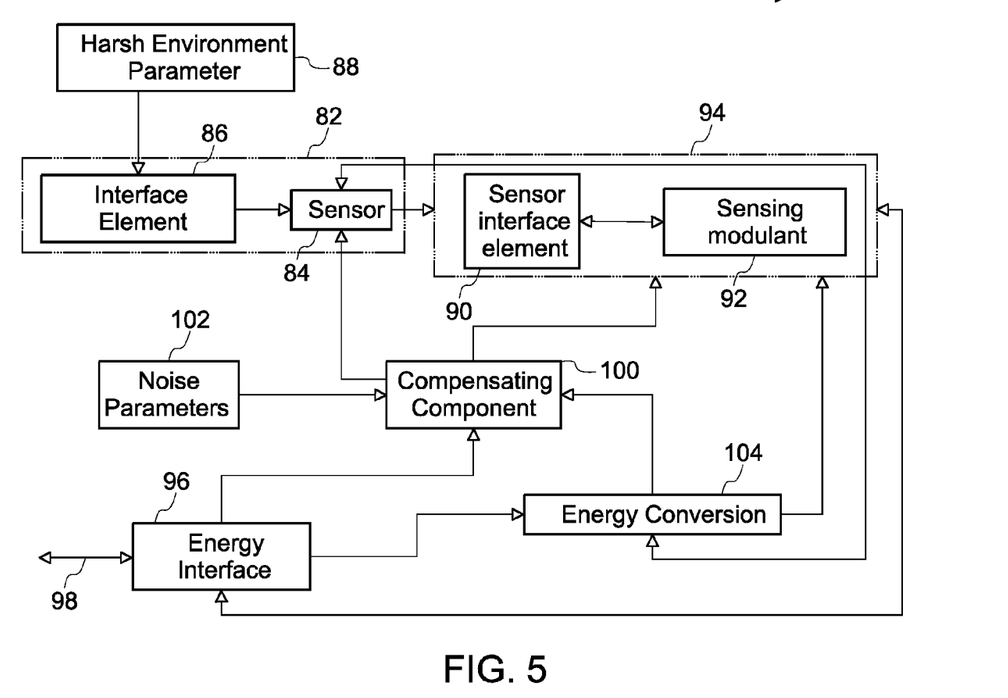
FIG. 5 is a schematic diagram representative of a second energy transceiver system in accordance with an embodiment of the invention.

FIG. 5 shows a schematic diagram representative of the second energy transceiver system 80 disposed on the object of the rotary machine. As illustrated, a sensing system 82 of the second energy transceiver system 80 forms a sensor circuit and includes a sensor 84 in addition to an interface element 86 such as a dielectric material. In a non-limiting example, the sensor 84 may be a capacitor having the dielectric material disposed on the object. In one embodiment, the secondary energy transceiver system 80 may be partially disposed on the moving object, wherein the sensor 84 may be disposed on the moving object such as on a blade of an aircraft engine or a bucket of a gas turbine. The remaining features of the second energy transceiver system 80 may be disposed on the non-moving part of an object. The non-moving part may be outside harsh environment. The second energy transceiver system 80 further includes a resonance circuit represented by reference numeral 94 including a sensor interface element 90. In one embodiment, the sensor interface element 90 is a capacitor in parallel with an inductor in the resonance circuit 94. Any change in the impedance of the resonance circuit 94 is represented by a sensing modulant 92. Thereby, the output of the sensor 84 is connected to the sensing modulant 92 through the sensor interface element 90. The channels connecting the various sensor elements as shown in FIG. 4 represent various pathways of energy signal transmission and receptions in the second energy transceiver system 80.

In one embodiment, the sensor 84 may be chosen from a group that includes a capacitor, an inductor, nano-scale NEMS device, a micro-scale MEMS device and a meso-scale direct-write device. The direct-write device is a directly printed device and includes circuitry deposits, which deposits may further include a conductor, a resistor, a capacitor or an antenna. In some embodiments, the interface element 86 may include a material that changes permeability in response to temperature, strain or crystalline deformations that may cause realignment of atomic structure.

Embodiments of the interface element 86 may also include a high magnetic permeability material selected to modulate an inductive circuit, or a relatively high permittivity material selected to modulate the capacitance of a capacitor circuit. Non-limiting examples of the magnetic permeability material may include Nickel (Ni), Iron (Fe), Cobalt (Co), Manganese (Mn), Chromium (Cr), Copper (Cu), and Gold (Au). In some embodiments interface element 86 may have a relatively high permittivity with respect to air, allowing for the use of a relatively small capacitor. Further, the interface element 86 is an operating parameter responsive material that may be selected to have a high Curie point. The present sensor system thereby may produce accurate results at temperatures up to about 1200° C. In another embodiment, the interface element 86 includes a dielectric element disposed on the object in the harsh environment. The dielectric element may further be chosen from an oxide group. Non-limiting examples of the oxide group may include a glass, borosilicate glass, zirconia, alumina, piezoelectrics, ferroelectrics and magnesia. The dielectric constant of the dielectric element varies directly with harsh operating parameters 88 of the object. Non-limiting examples of the harsh operating parameters 88 of the object include temperature, strain, pressure, clearance and displacement.

In one non-limiting example, the sensor 84 may include a capacitor with a high dielectric material disposed on a thermal barrier coating of a turbine blade. Non-limiting examples of the high dielectric material may include hafnium silicate, zirconium silicate, hafnium dioxide, alumina, magnesia, and zirconium dioxide. The dielectric constant of the dielectric material may vary directly with the temperature or strain of the turbine blade. Any variation in the dielectric constant directly registers a change in the capacitance of the sensor of the sensor circuit. This induces a modulation in the impedance of the resonance circuit.

The second energy transceiver system 80 also includes an energy interface element 96. In one embodiment, the energy interface element 96 is a transceiver antenna for transceiving energy signals via the interrogation channel 98 to the first energy transceiver system 52 (of FIG. 3). The second energy transceiver system 80 further includes a compensating component 100. In one embodiment, the compensating component 100 is a modulant that varies only with noise parameters 102 and not with the operating parameters 88 sensed by the sensing system 82 of the second energy transceiver system 80. The noise parameters 102 may include temperature variations and transmit power variations. The sensing system 82 may be vulnerable to variations such as power, gap and noise parameters 102. The compensating component 100 is thereby configured to determine an error due to the noise parameters 102. The second energy transceiver system 80 substantially adjusts the energy signals according to the error determined by the compensating component 100 and then further tranceives the energy signals. Therefore, the compensating component 100 ensures corrected operating parameter measurements by the harsh environment sensor system.

Furthermore, the second energy transceiver system 80 includes an energy conversion element 104. In one embodiment, this energy conversion element 104 convert received energy to a form that can be transmitted and affected by the sensing modulant 92 and the sensing interface element 90. In another embodiment, the second energy transceiver system 80 may include an energy transformer. The energy transformer may be arranged to shift the frequency range of operation of the responance circuit 94 circuit including energy interface 96 and sensor components in the sensing system 82 to a more suitable range, and amplify the resulting frequency shift detected at the first energy interface element 32 as shown in FIG. 3.

Figure 6:
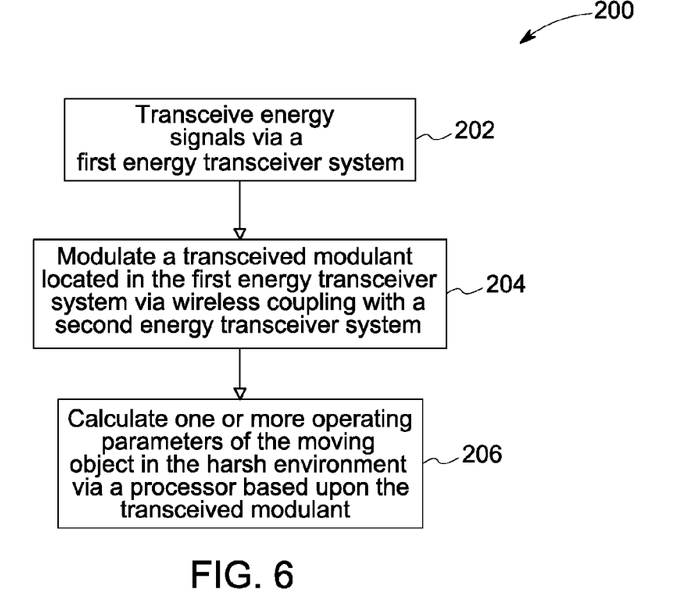
FIG. 6 is a flow chart of a method for measuring an operating parameter of an object in a harsh environment.

FIG. 6 shows an embodiment of a method 200 for measuring an operating parameter of an object in a harsh environment. The method 200 includes transceiving energy signals via a first energy transceiver system as represented in block 202. In block 204, the method 200 includes modulating a transceived modulant located in the first energy transceiver system via wireless coupling with a second energy transceiver system, wherein the second energy transceiver system is at least partially disposed on the object. Further, in block 206, the method 200 includes calculating one or more operating parameters of the object in the harsh environment via a processor based upon the transceived modulant.

In some embodiments, the modulating element may comprise a high permeability material in an inductive embodiment of a harsh environment sensor system, or a high permittivity material in a capacitive embodiment. Some examples of high permeability materials that may be used in embodiments of a harsh environment sensor include, but are not limited to, iron alloys, nickel alloys, an iron-nickel alloy, chrome, or other ferromagnetic alloys. Examples of high permittivity materials may include, but are not limited to, oxides, ceramics, alumina, barium silicate, as well as conventional capacitor ceramic material such as NPO and X7R, or $LiNbO_3$. An appropriate material may be selected based on the harsh environment component and the parameters of the machine that is being measured, as different materials may have different magnetic responses to the operating parameters. Embodiments of a harsh environment sensor system may be used to detect various operating parameters in any machine that comprises rotating components or stationary components, including but not limited to a compressor or a turbine in an aircraft engine, power generation turbines such as gas or steam turbines, or a generator.

Advantageously, the harsh environment sensor system provides measurement of various operating parameters of the moving object as well as the stationary objects of a rotary machine. This knowledge helps in determining the overall health and reliability of the machines. Furthermore, the harsh environment sensor system effectively forms an integral part of the instrumentation of machines operating in harsh environment. This results in measurement of operating parameter data from machines with enhanced accuracy, sensitivity and specificity. The application of the harsh environment sensor system in the instrumentation of machines successfully leads to reduction in maintenance time and costs.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A rotary machine comprising:
   a stationary part;
   a moving part;
   a first system positioned adjacent to or on the stationary part;
   a second system positioned on the moving part and configured to have an impedance which varies in response to changes in operating conditions of the moving object, wherein the second system consists essentially of no active electronics;
   an interrogation channel between the first and second systems, wherein the second system is configured for, when interrogated by the first system through the interrogation channel, communicating via near field magnetic or near field inductive coupling with the first system through the interrogation channel, wherein the communicating results from a modulation of an impedance of a circuitry of the first system in response to modulations of the impedance of the second system; and
   a processor for determining a plurality of operating parameters of the moving part of the rotary machine based upon the modulated impedance of the circuitry of the first system.

2. The rotary machine of claim 1, wherein the second system comprises a sensor component and a resonance circuit.

3. The rotary machine of claim 2, wherein the sensor component comprises at least one of a nano-scale device, a micro-scale device, and a meso-scale directly printed device.

4. The rotary machine of claim 2, wherein the sensor component comprises a capacitor.

5. The rotary machine of claim 4, wherein the capacitor comprises a dielectric element disposed on the moving part.

6. The rotary machine of claim 2, wherein the sensor component comprises an inductor.

7. The rotary machine of claim 1, wherein the operating parameters comprise at least two of a temperature, strain, pressure, clearance, and displacement.

8. The rotary machine of claim 1, wherein the second system comprises an operating parameter responsive material comprising at least one of a magnetic permeability material, a dielectric material, a Curie point material, and a permittivity material.

* * * * *

UNITED STATES PATENT AND TRADEMARK OFFICE
CERTIFICATE OF CORRECTION

PATENT NO. : 8,924,182 B2  
APPLICATION NO. : 12/510302  
DATED : December 30, 2014  
INVENTOR(S) : Berkcan et al.

Page 1 of 1

It is certified that error appears in the above-identified patent and that said Letters Patent is hereby corrected as shown below:

On the Title Page, in item (57), under "ABSTRACT", in Column 2, Line 4, delete "transcieved" and insert -- transceived --, therefor.

On Title Page 2, in item (56), under "OTHER PUBLICATIONS", in Column 1, Line 6, delete "internet<http://gltrs.grc.nasa.gov/" and insert -- internet:<http://gltrs.grc.nasa.gov/ --, therefor.

In the Specification

In Column 1, Line 52, delete "transcieved" and insert -- transceived --, therefor.

In Column 5, Line 3, delete "system 54" and insert -- system 52 --, therefor.

In Column 6, Line 61, delete "responance" and insert -- resonance --, therefor.

Signed and Sealed this  
Fourteenth Day of April, 2015

Michelle K. Lee  
*Director of the United States Patent and Trademark Office*